(12) United States Patent
Caple

(10) Patent No.: US 6,412,583 B1
(45) Date of Patent: *Jul. 2, 2002

(54) SPLIT LEVER EMERGENCY BRAKE

(76) Inventor: Steven L. Caple, 45855 Hwy. 6-#57, Glenwood Springs, CO (US) 81601

( * ) Notice: Subject to any disclaimer, the term of this patent is extended or adjusted under 35 U.S.C. 154(b) by 0 days.

This patent is subject to a terminal disclaimer.

(21) Appl. No.: 09/574,522

(22) Filed: May 19, 2000

(51) Int. Cl.[7] .................................................. B60T 7/14
(52) U.S. Cl. ....................... 180/190; 180/272; 188/110; 303/19; 74/488
(58) Field of Search ................................ 180/272, 190; 74/488, 489, 501.6, 502.2, 523, 524; 188/353, 110, 265; 303/19, 89

(56) References Cited

U.S. PATENT DOCUMENTS

| 3,684,045 A | * | 8/1972 | Samuelson | 180/190 |
| 3,957,131 A | * | 5/1976 | Perkins | 180/272 |
| 5,642,788 A | * | 7/1997 | Mabbott | 180/272 |
| 6,000,487 A | * | 12/1999 | Caple | 180/190 |

* cited by examiner

Primary Examiner—Peter C. English

(57) ABSTRACT

A split lever emergency brake system for a recreational vehicle with a lever-actuated braking mechanism for precluding movement of the recreational vehicle upon the actuation thereof. Also included is a tether for wearing by a rider of the recreational vehicle. A release mechanism is coupled to the braking mechanism and the tether for actuating the braking mechanism upon the rider inadvertently falling off of the recreational vehicle.

11 Claims, 8 Drawing Sheets

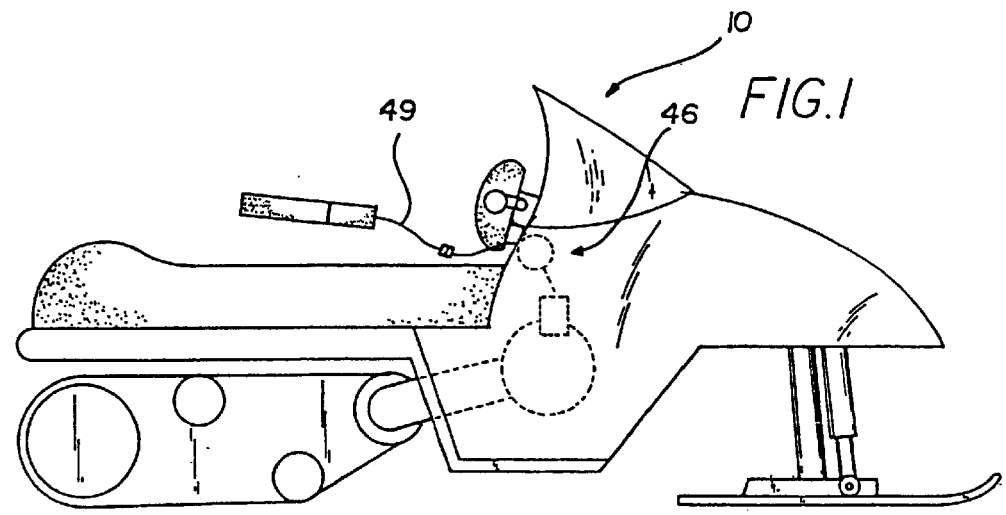
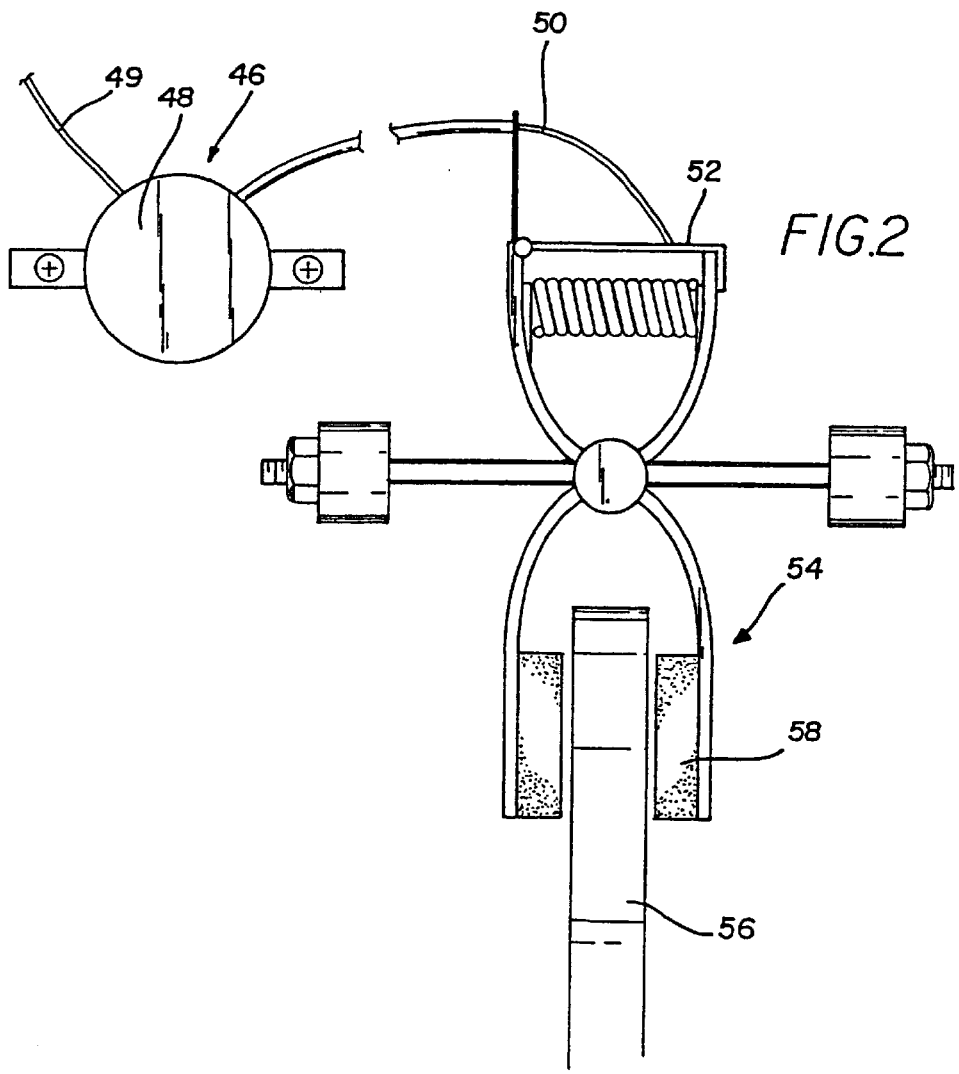

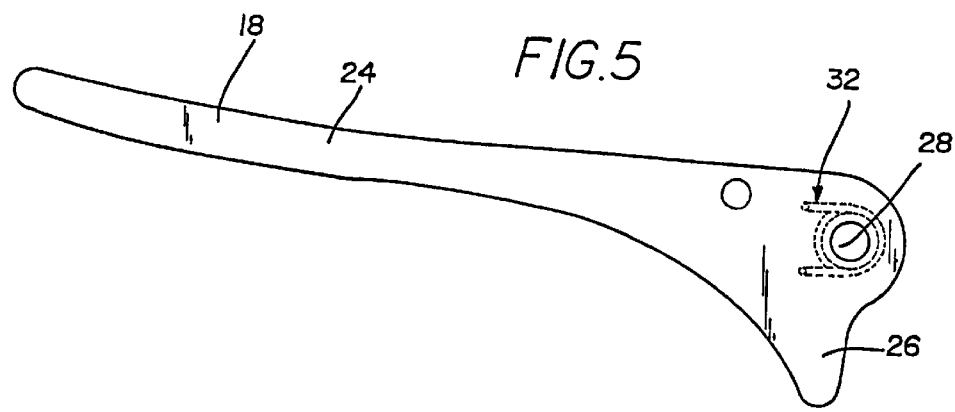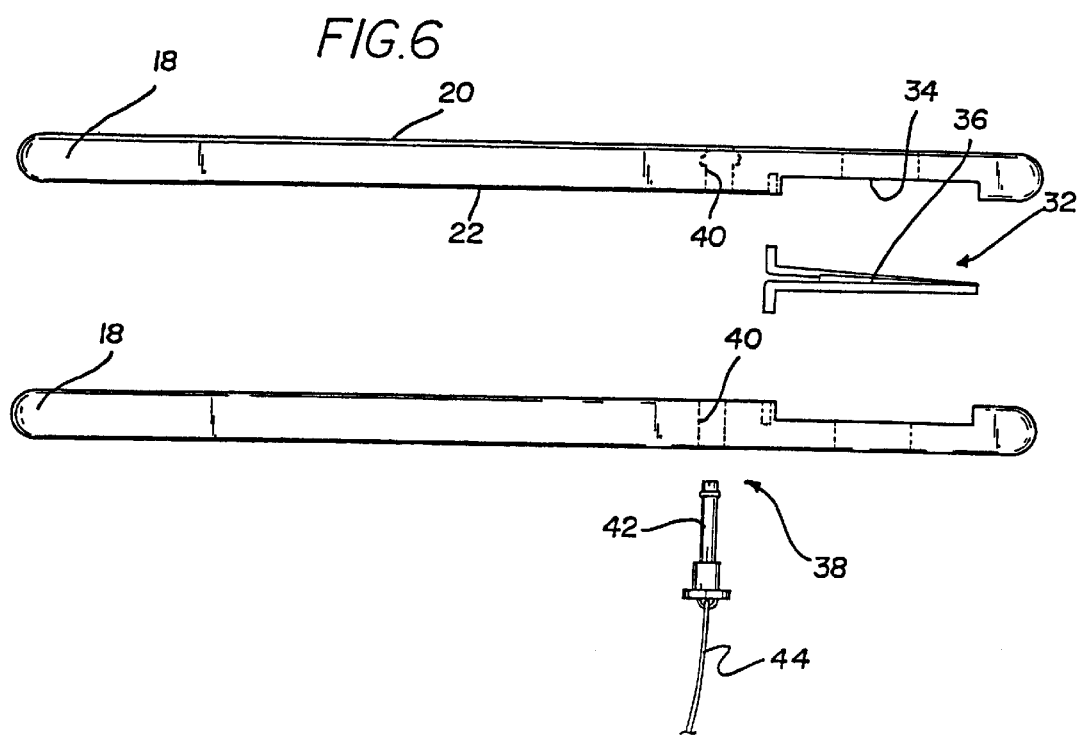

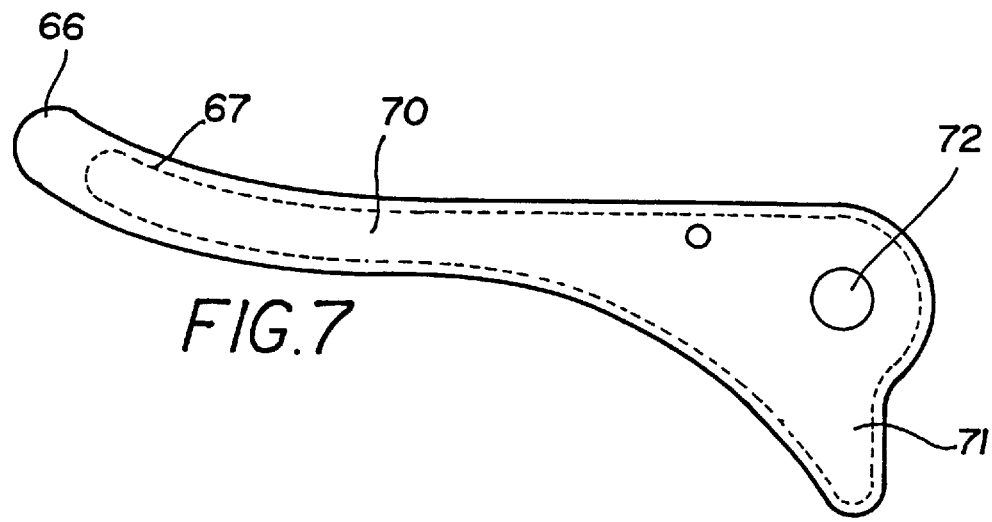
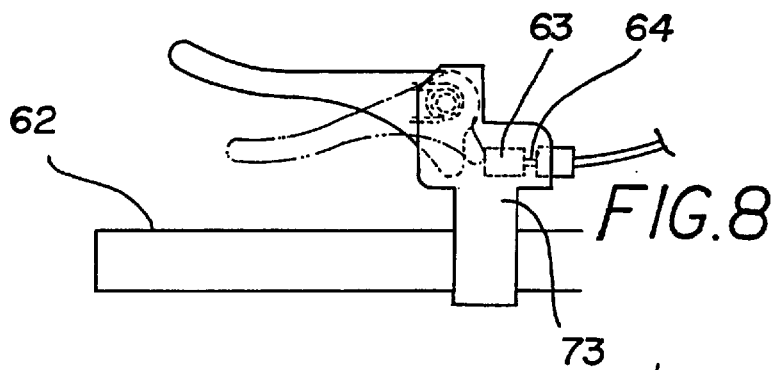
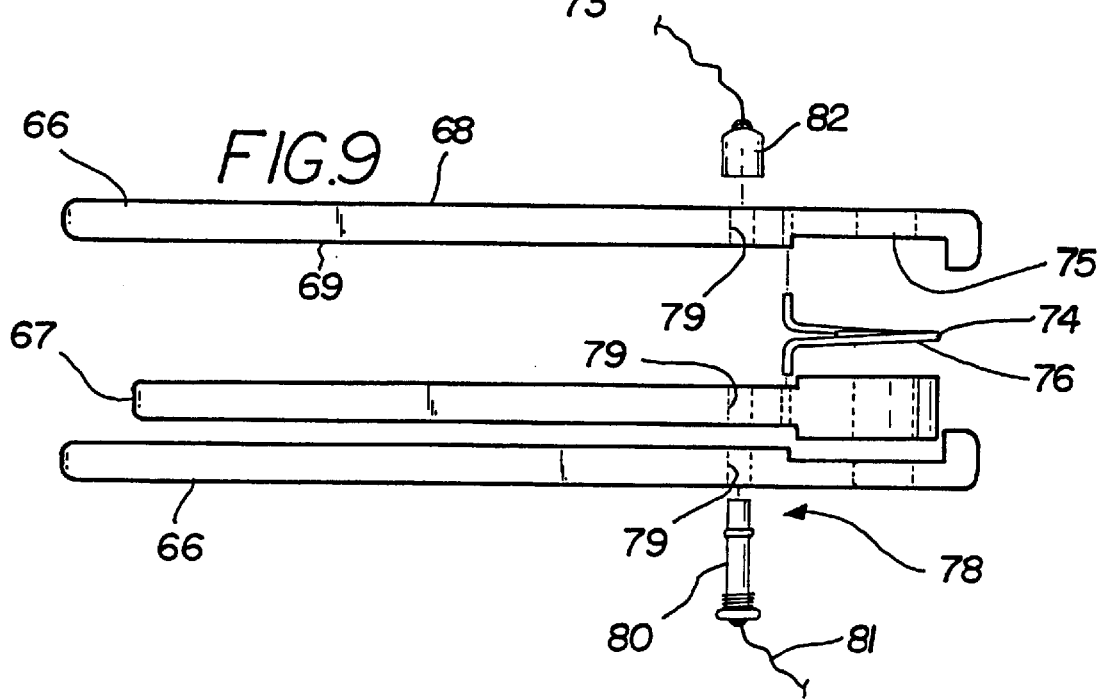

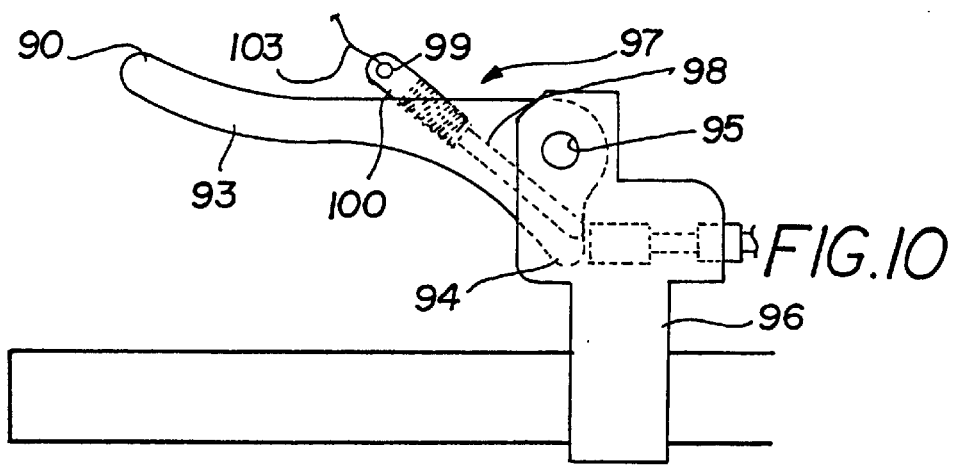
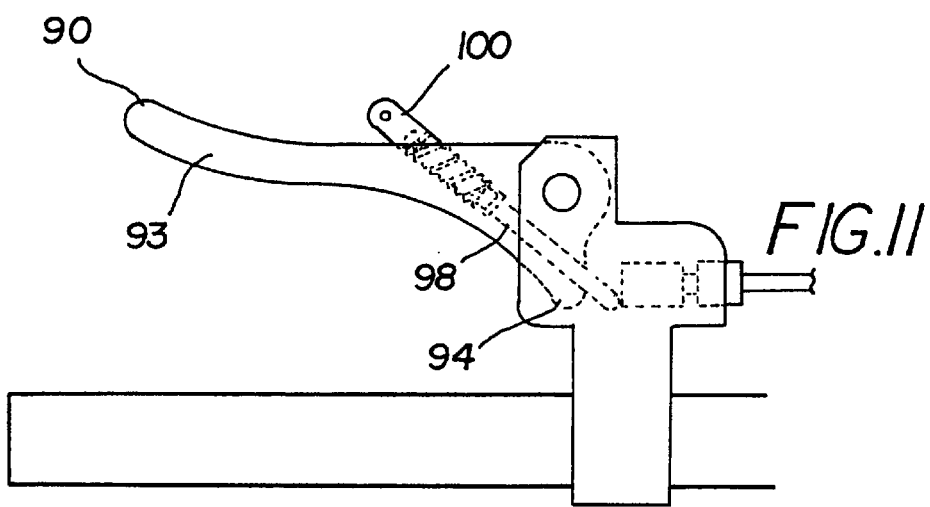
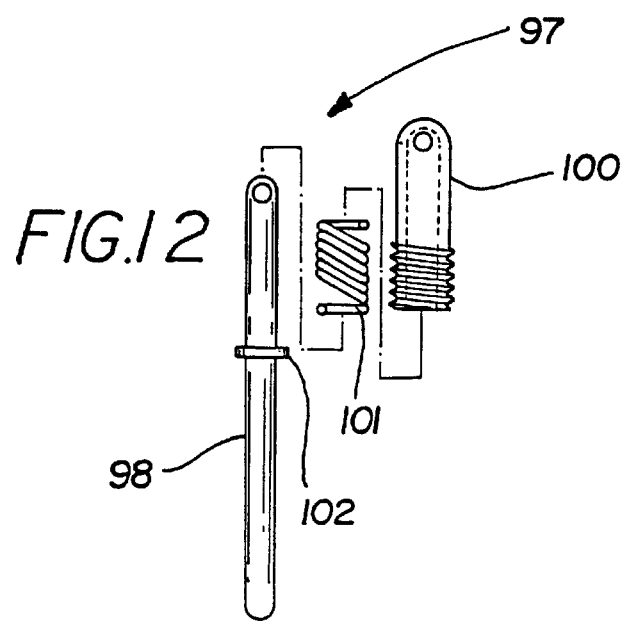

SPLIT LEVER EMERGENCY BRAKE

BACKGROUND OF THE INVENTION

1. Field of the Invention

The present invention relates to recreational vehicle emergency braking systems and more particularly pertains to a new split lever emergency brake for immobilizing a recreational vehicle such as a snowmobile or all-terrain vehicle upon a rider inadvertently dismounting the same.

2. Description of the Prior Art

The use of engine cut off systems is known in the prior art. More specifically, engine cut off systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art engine cut off systems and the like include U.S. Pat. Nos. 3,938,613; 4,539,452; 4,520,890; 4,362,524; 5,299,466; U.S. Pat. Des. No. 244,870; U.S. Pat. Nos. 5,642,788; 3,957,131; 3,825,092; 3,536,153; 3,684,045; and 3,521,718.

In these respects, the split lever emergency brake according to the present invention substantially departs from the conventional concepts and designs of the prior art, and in so doing provides an apparatus primarily developed for the purpose of immobilizing a recreational vehicle such as a snowmobile or all-terrain vehicle upon a rider inadvertently dismounting the same.

SUMMARY OF THE INVENTION

In view of the foregoing disadvantages inherent in the known types of engine cut off systems now present in the prior art, the present invention provides a new split lever emergency brake construction wherein the same can be utilized for immobilizing a recreational vehicle such as a snowmobile or all-terrain vehicle upon a rider inadvertently dismounting the same.

The general purpose of the present invention, which will be described subsequently in greater detail, is to provide a new split lever emergency brake apparatus and method which has many of the advantages of the engine cut off systems mentioned heretofore and many novel features that result in a new split lever emergency brake which is not anticipated, rendered obvious, suggested, or even implied by any of the prior art engine cut off systems, either alone or in any combination thereof.

To attain this, the present invention includes a recreational vehicle with a braking mechanism for precluding movement of the recreational vehicle upon the actuation thereof. Also included is a tether for wearing by a rider of the vehicle. A release mechanism is coupled to the braking mechanism and the tether for actuating the braking mechanism upon the rider inadvertently falling off the recreational vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new split lever emergency brake apparatus and method which has many of the advantages of the engine cut off systems mentioned heretofore and many novel features that result in a new split lever emergency brake which is not anticipated, rendered obvious, suggested, or even implied by any of the prior art engine cut off systems, either alone or in any combination thereof.

It is another object of the present invention to provide a new split lever emergency brake which may be easily and efficiently manufactured and marketed.

It is a further object of the present invention to provide a new split lever emergency brake which is of a durable and reliable construction.

An even further object of the present invention is to provide a new split lever emergency brake which is susceptible of a low cost of manufacture with regard to both materials and labor, and which accordingly is then susceptible of low prices of sale to the consuming public, thereby making such split lever emergency brake economically available to the buying public.

Still yet another object of the present invention is to provide a new split lever emergency brake which provides in the apparatuses and methods of the prior art some of the advantages thereof, while simultaneously overcoming some of the disadvantages normally associated therewith.

Still another object of the present invention is to provide a new split, lever emergency brake for immobilizing a snowmobile upon a rider inadvertently dismounting the same.

Even still another object of the present invention is to provide a new split lever emergency brake for use with a recreational vehicle having a braking mechanism for precluding movement of the vehicle upon the actuation thereof. Also included is a tether worn by a rider of the recreational vehicle. A release mechanism is coupled to the braking mechanism and the tether for actuating the braking mechanism upon the rider inadvertently falling off the recreational vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred a embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a snowmobile employing one of the embodiments of the present invention.

FIG. 2 is a side view of an auxiliary brake assembly of the embodiment of FIG. 1.

FIG. 5 is a top view of the gripping levers of the embodiment of FIG. 4 shown separated from the snowmobile.

FIG. 6 is a side exploded view of the present invention showing the gripping levers and spring detached.

FIG. 7 is a top view of a gripping lever of the embodiment of FIG. 8 shown separated from the snowmobile.

FIG. 8 is a schematic top view of a third embodiment of the present invention.

FIG. 9 is a side exploded view of the embodiment of the present invention shown in FIG. 8 showing the gripping levers and spring detached.

FIG. 10 is a schematic top view of a fourth embodiment of the present invention shown in a retracted position.

FIG. 11 is a schematic top view of the fourth embodiment of the present invention shown in an extended position.

FIG. 12 is an exploded view of the piston and cylinder of the fourth embodiment of the present invention.

DESCRIPTION OF THE PREFERRED EMBODIMENT

Figure 3:
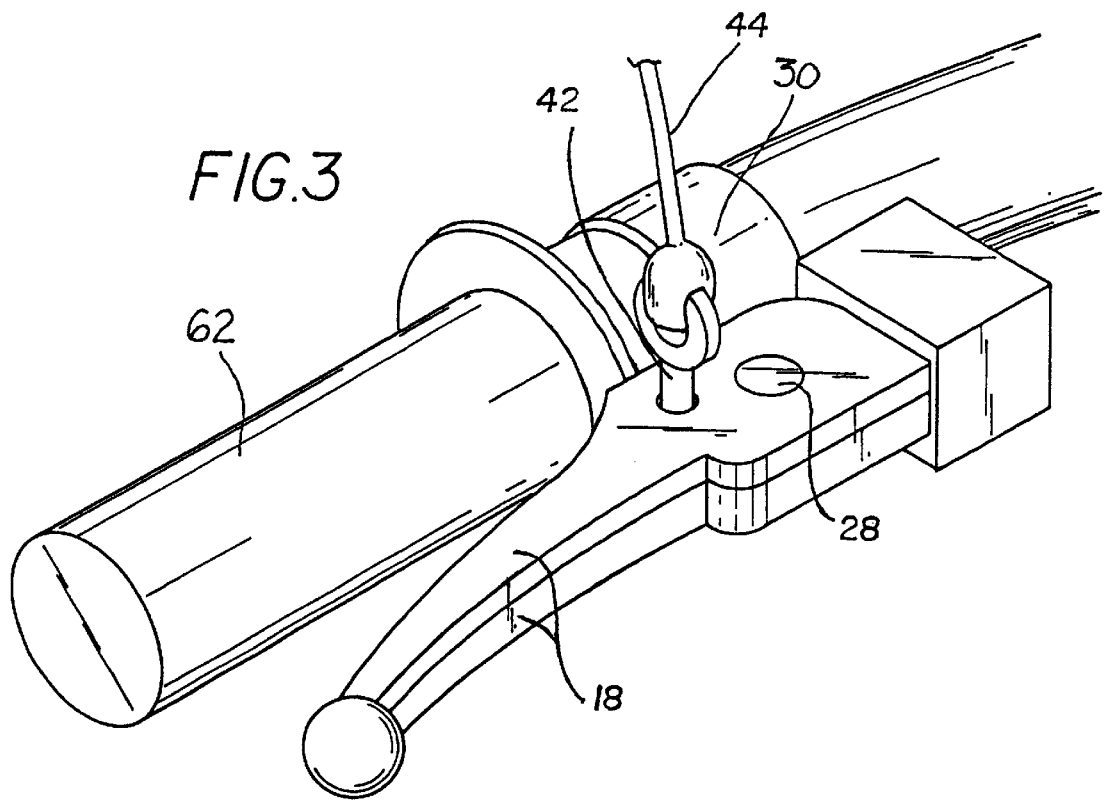
FIG. 3 is a schematic perspective view of another embodiment of the present invention.

With reference now to the drawings, and in particular to FIGS. 1 through 18 thereof, a new split lever emergency brake embodying the principles and concepts of the present invention and generally designated by the reference numeral 10 will be described.

The present invention may take various forms, one of which includes the embodiment shown in FIGS. 1 and 2, another of which is shown in FIGS. 3 through 6, a third of which is shown in FIGS. 7 through 9, a fourth of which is shown in FIGS. 10 through 12, and a fifth of which is shown in FIGS. 15 through 18.

It should be noted that the invention may be employed on a variety of recreational vehicles, including, but not limited to, snowmobiles, all-terrain vehicles, motorcycles, and other vehicles employing a hand grip with a lever-actuated brake mechanism. For the purposes of the following description, the invention is described in the environment of a snowmobile, although the teaching may be readily applied to other recreational vehicles.

The embodiment of FIGS. 4 through 6 will first be described. Such embodiment is adapted for use with a snowmobile 60, best shown in FIG. 13, with a motorized treaded belt and a hydraulic brake 61 for precluding the movement of the treaded belt upon the actuation thereof. The snowmobile further includes a handle assembly with a grip 62. A spring biased push button 63 is mounted on the handle assembly adjacent to an inboard end of the grip for actuating the hydraulic brake upon the depression thereof via a hydraulic piston 64 (see FIG. 8) that forces fluid through tubing to a second hydraulic piston 65 attached to the hydraulic brake, shown in FIG. 14.

Figure 4:
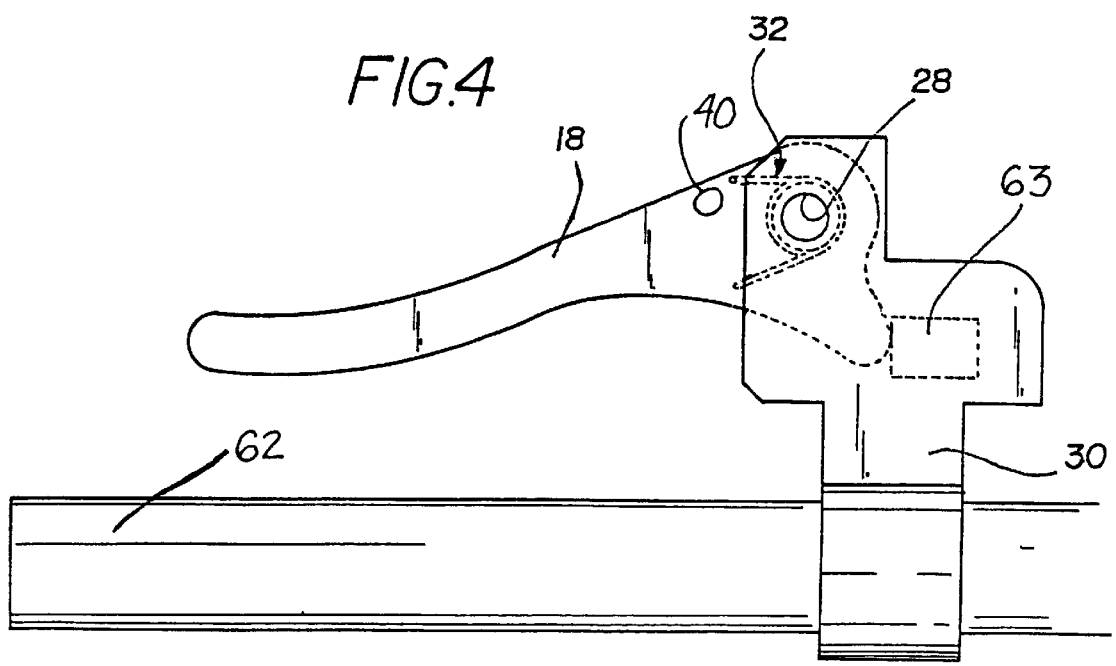
FIG. 4 is a top view of the embodiment of the present invention shown in FIG. 3, showing the invention in greater detail.
Figure 13:
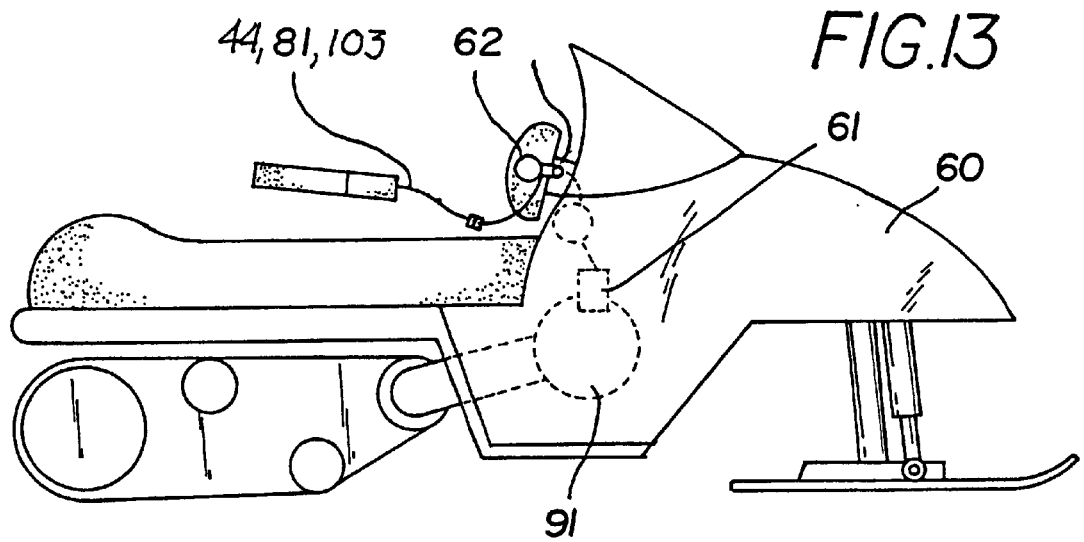
FIG. 13 is a schematic side view illustrating the positioning of the handle and the brake on the snowmobile.
Figure 14:
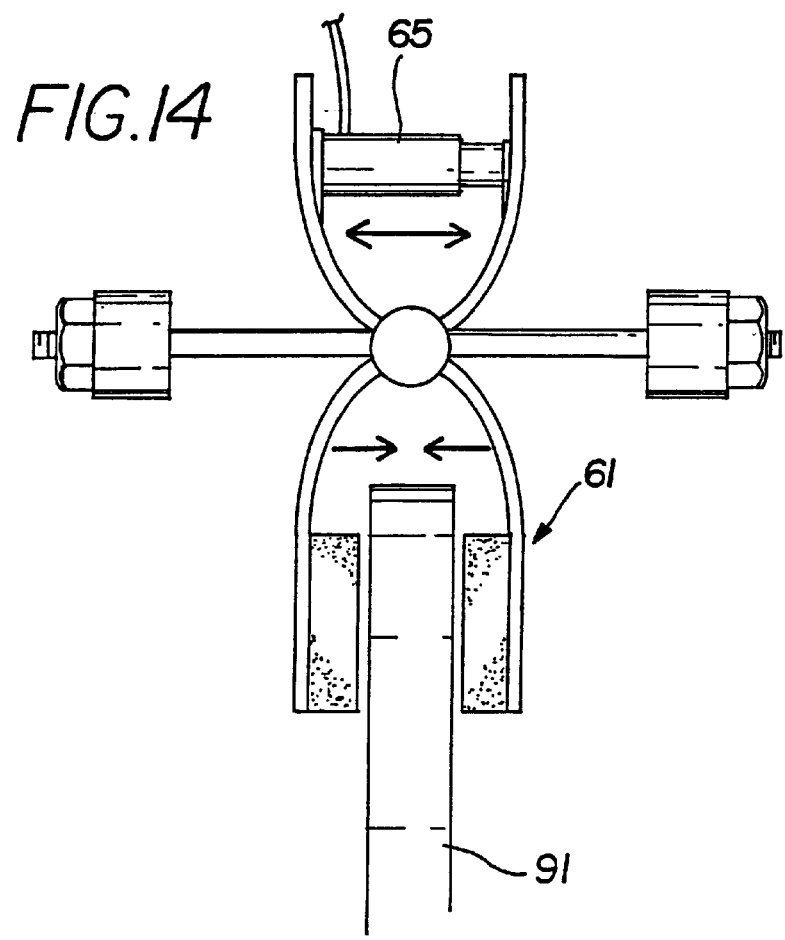
FIG. 14 is a side view of a hydraulic brake structure of the present invention.
Figure 15:
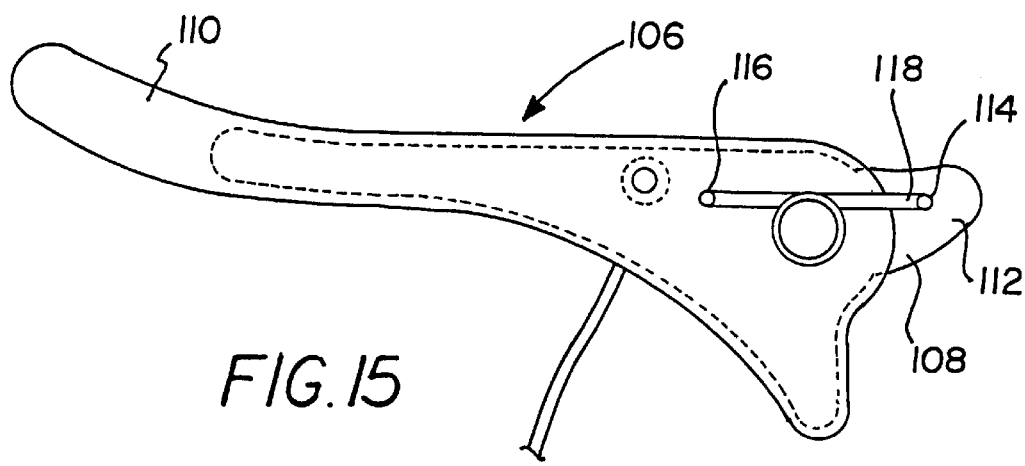
FIG. 15 is a top view of a fifth embodiment of the present invention.
Figure 16:
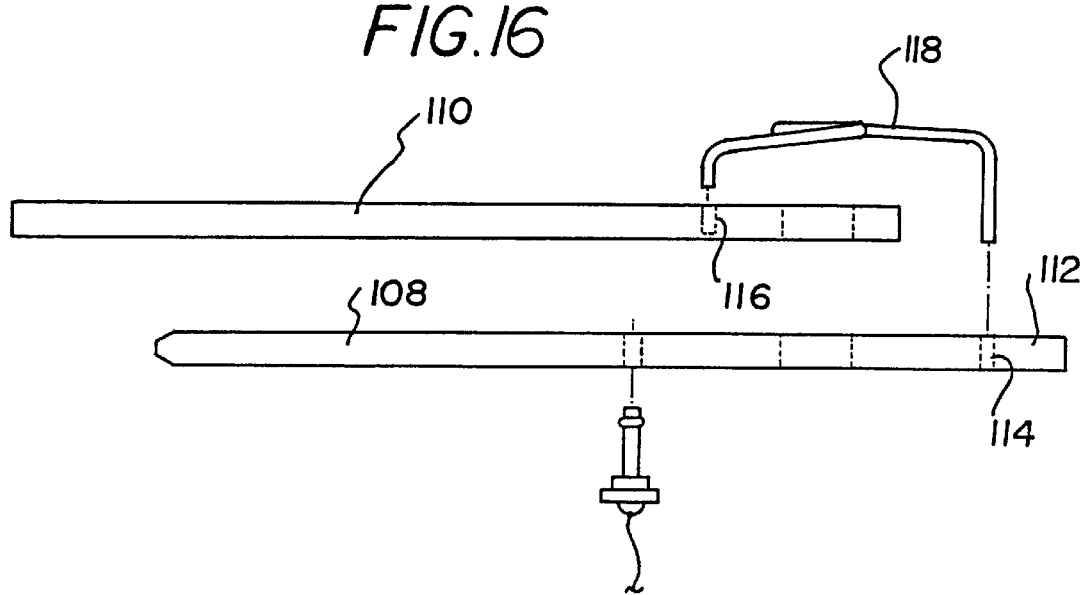
FIG. 16 is an exploded view of the upper and lower levers of the fifth embodiment showing the gripping levers and spring detached from each other.
Figure 17:
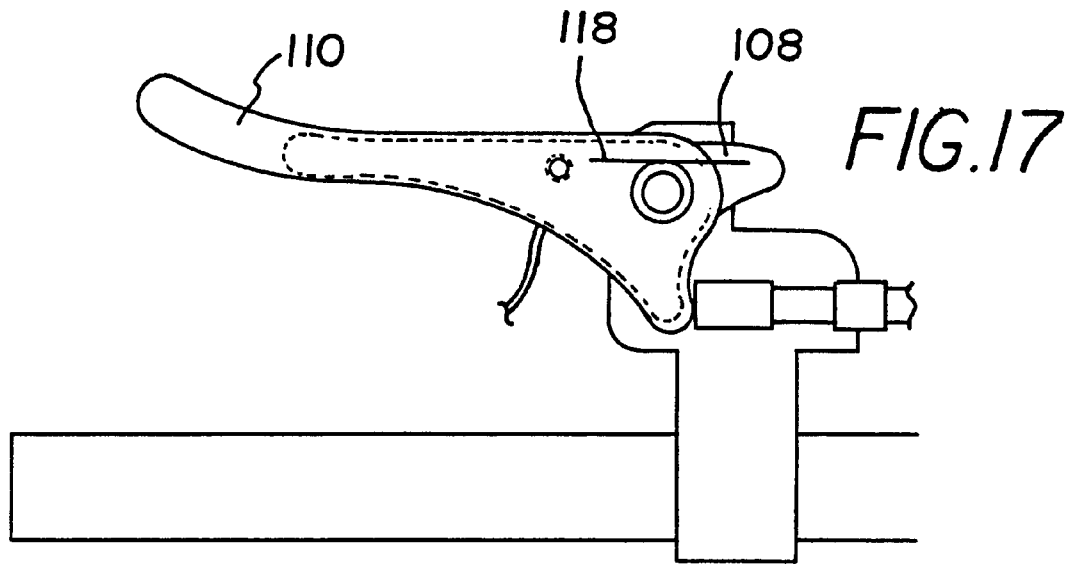
FIG. 17 is a schematic top view of the upper and lower levers of the fifth embodiment shown in a locked condition.
Figure 18:
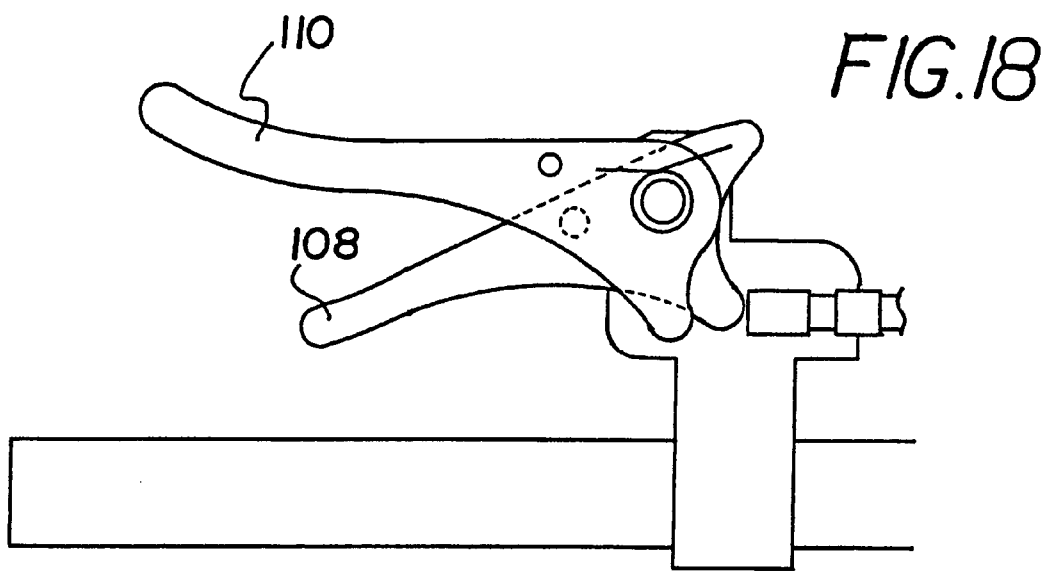
FIG. 18 is a schematic top view of the upper and lower levers of the fifth embodiment shown in a unlocked condition.

FIGS. 4 through 6 show a pair of gripping levers 18 each with an arcuate outer surface 20, a planar inner surface 22 and a periphery formed therebetween. As shown in FIGS. 4 and 5, the periphery defines a thin, elongated arcuate gripping portion 24 and an engagement portion 26. Each gripping lever has a pivoting aperture 28 formed between the gripping portion and engagement portion. Such pivoting aperture is adapted for being pivotally mounted to a bracket 30. This bracket is in turn coupled to the inboard end of the grip of the snowmobile.

In operation, the inner surfaces of the gripping levers are in slidable abutment. Further, the gripping levers are each independently pivotable between a first orientation and a second orientation. In the first orientation, the gripping portion of the gripping lever is spaced from the grip and the engagement portion is out of engagement with the push button. In the second orientation, the gripping lever abuts the grip and the engagement portion resides in engagement with the push button for depressing the same.

FIG. 6 shows a spring assembly 32 including a pair of recesses 34 formed in the inner faces of the gripping levers. Such recesses are formed about the pivoting aperture of the gripping levers for defining a compartment. A coil spring 36 is situated within the compartment with a pair of ends each connected to a distinct one of the gripping levers. The coil spring functions for urging the gripping levers out of alignment such that one of the gripping levers is urged into the second orientation.

Next provided is a trigger assembly 38 including a pair of bores 40 formed in the gripping levers. A pin 42 is removably situated within the bores for maintaining both the gripping levers in alignment and in the first orientation thereof when not biased by a rider. Upon the rider falling off the snowmobile, a tether 44 connected between the pin and the rider removes the pin. The tether preferably takes the form of a waist band or the like. The pin preferably enters the bores from beneath the gripping levers and further has an annular detent which is adapted to snappily engage an annular indent formed in one of the gripping levers.

The embodiment of FIGS. 1 and 2 will now be described. In this embodiment, a release mechanism 46 includes a spring biased spool 48 about which the tether 49 is wound. A trigger assembly is associated with the spool for retracting a wire 50 upon the spool completely unwinding. This may be accomplished in any of numerous ways. For example, the spool may be mounted on a ball screw and have a catch mounted on an end thereof. When the spool is unwound the spool and catch would move along an axis of the ball screw for engaging another catch which is attached to the wire. The wire is in turn connected to a release arm 52 which actuates an auxiliary brake 54 via spring action upon the wire being retracted. Note FIG. 2. It should be noted that the brake associated with the present embodiment includes a flywheel 56 with brake pads 58 abutting the same when the release arm releases the spring. In use, the present embodiment allows a user to be distanced from the snowmobile prior to the same being immobilized.

In the embodiment shown in FIGS. 7 through 9, 13, and 14 a snowmobile 60 has a motorized treaded belt and a hydraulic brake 61 for precluding the movement of the treaded belt upon the actuation thereof. The hydraulic brake should clamp down a drive wheel 91 of the snowmobile. The snowmobile further includes a handle assembly with a grip 62. A spring biased push button 63 is mounted on the handle assembly adjacent to an inboard end of the grip for actuating the hydraulic brake upon the depression thereof via a hydraulic piston 64 that forces fluid through tubing to a second hydraulic piston 65 attached to the hydraulic brake.

A pair of outer gripping levers 66 and an inner gripping lever 67 are pivotally mounted to the grip of the snowmobile. The inner gripping lever is positioned between the outer gripping levers.

Each of the outer gripping levers has an arcuate outer surface 68, a planar inner surface 69 and a periphery formed therebetween which defines a thin, elongated arcuate gripping portion 70 and an engagement portion 71. Each gripping lever has a pivoting aperture 72 formed between the gripping portion and engagement portion. Such pivoting aperture is adapted for being pivotally mounted to a bracket 73. This bracket is in turn coupled to the inboard end of the grip of the snowmobile.

In operation, the inner surfaces of the outer gripping levers are in slidable abutment with the inner gripping lever. Further, the three gripping levers are each independently pivotable between a first orientation and a second orientation. In the first orientation, the gripping portion of the gripping lever is spaced from the grip and the engagement portion is out of engagement with the push button. In the second orientation, the gripping portion abuts the grip and the engagement portion resides in engagement with the push button for depressing the same.

FIG. 9 shows a spring assembly 74 including a recess 75 formed in the inner face of one of the outer gripping levers and defining a compartment. A coil spring 76 is situated within the compartment with a pair of ends. One of the ends is connected to the outer gripping lever forming the recess. The other of the ends is connected to the inner gripping lever. The coil spring functions for urging the associated gripping levers out of alignment such that one of the gripping levers, preferably the inner gripping lever, is urged into the second orientation.

A trigger assembly 78 includes three bores 79 formed in the gripping levers. A pin 80 is removably situated within the bores for maintaining all three of the gripping levers in alignment and in the first orientation thereof when not biased by a rider. Upon the rider falling off the snowmobile, a tether 81 connected between the pin and the rider removes the pin. The tether preferably takes the form of a waist band or the like. The pin preferably enters the bores from beneath the gripping levers and further has an annular detent which is adapted to snappily engage an annular indent formed in one of the gripping levers, or a cap 82.

In the embodiment shown in FIGS. 10 through 14 a snowmobile 60 has a motorized treaded belt and a hydraulic brake 61 for precluding the movement of the treaded belt upon the actuation thereof. The snowmobile further includes a handle assembly with a grip 62. A spring biased push button 63 (see FIG. 8) is mounted on the handle assembly adjacent to an inboard end of the grip for actuating the hydraulic brake upon the depression thereof via a hydraulic piston 64 (see FIG. 8) that forces fluid through tubing to a second hydraulic piston 65 attached to the hydraulic brake.

A gripping lever 90 is pivotally mounted to the grip of the snowmobile.

The gripping lever has a thin, elongated arcuate gripping portion 93 and an engagement portion 94. The gripping lever has a pivoting aperture 95 formed between the gripping portion and engagement portion. Such pivoting aperture is adapted for being pivotally mounted to a bracket 96. This bracket is in turn coupled to the inboard end of the grip of the snowmobile.

The gripping lever is pivotable between a first orientation and a second orientation. In the first orientation, the gripping portion of the gripping lever is spaced from the grip and the engagement portion is out of engagement with the push button. In the second orientation, the gripping portion abuts the grip and the engagement portion resides in engagement with the push button for depressing the same.

The gripping lever has a piston assembly 97 that has a piston 98 slidably received in the gripping lever. The piston is positionable between a retracted position and an extended position. As shown in FIG. 10, the piston is held away from the push button when in the retracted position by a release pin 99 inserted through a hole in the outer end of the piston. As seen in FIG. 11, the piston presses in the push button when in the extended position. Ideally, the piston assembly includes a sleeve 100 coupled to the gripping lever and into which an outer end of the piston is slidably inserted. The piston is biased towards the extended position by a spring 101 engaging the sleeve and a flange 102 of the piston. When the sleeve is used, the pin is inserted through holes in the sleeve. The use of the sleeve permits removal of the piston assembly for cleaning and repair.

Upon the rider falling off the snowmobile, a tether 103 connected between the pin and the rider removes the pin. The tether preferably takes the form of a waist band or the like. The pin preferably has an annular detent which is adapted to snappily engage an annular indent formed in the piston.

An optional variation 106 of the invention is shown in FIGS. 15 through 18, and includes a single inner 108 and a single outer 110 gripping lever. The levers 108, 110 are positioned adjacent to each other, and have a similar perimeter profile. The inner gripping lever 108 has an ear 112 that extends outwardly beyond the profile of the outer gripping lever. A first spring mounting hole 114 is located on the ear of the inner gripping lever, and a second spring mounting hole 116 is located on the outer gripping lever. A spring 118 has opposite ends that are lodged in the respective spring mounting holes. The spring is adapted to apply a twisting force between the inner and outer gripping levers such that the inner gripping lever is biased away from a position of relative alignment between the inner and outer gripping levers toward a position of relative misalignment between the levers. The levers are held in a relatively aligned position by the release pin (see FIG. 17), and removal of the release pin from engagement with the levers permits the spring to move the inner gripping lever out of alignment with the outer gripping lever such that a lobe on the inner gripping lever engages the button (see FIG. 18).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination, a brake and a recreational vehicle comprising:
   a recreational vehicle with a braking mechanism for precluding movement of the recreational vehicle upon the actuation thereof;
   a pair of gripping levers being pivotally mounted to a grip of the recreational vehicle, wherein the gripping levers are each independently pivotable between a first orientation with the gripping levers spaced from the grip and the braking mechanism being disengaged and a second orientation with the gripping levers being positioned towards the grip and the braking mechanism being actuated, the gripping levers being biased out of alignment such that one of the gripping levers is urged towards the second orientation;
   a tether for attachment to a rider of the recreational vehicle; and
   a release mechanism engaging the gripping levers and the tether for actuating the braking mechanism upon the rider inadvertently falling off of the recreational vehicle.

2. The combination of claim 1 wherein a spring urges misalignment of the gripping levers.

3. The combination of claim 2 wherein the release mechanism includes a release pin coupled to the tether and extending through the gripping levers for allowing the spring to urge the actuation of the braking mechanism upon the rider inadvertently falling off of the recreational vehicle.

4. The combination of claim 1 wherein the release mechanism is situated on at least one of the gripping levers of the recreational vehicle which also allows manual actuation of the braking mechanism upon the pulling thereof.

5. An emergency braking system for use on a vehicle having a hand grip and a braking mechanism adapted for resisting movement of a drive mechanism of the vehicle when the braking mechanism is actuated, the system comprising:
   an inner gripping lever and at least one outer gripping lever adapted for being pivotally mounted to the hand grip of the vehicle, the inner gripping lever being positioned adjacent to the outer gripping lever, the inner and outer gripping levers each having a gripping portion and each being independently pivotable between a first orientation and a second orientation, the first orientation being characterized by the gripping portion of each of the gripping levers being spaced from the grip for deactuating the braking mechanism and the second orientation being characterized by the gripping portion of each of the gripping levers being positioned towards the grip for actuating the braking mechanism;
   a biasing member for biasing the inner gripping lever toward the second orientation;
   a tether for attachment to a rider of the vehicle, the tether having a length;
   a release mechanism locking the gripping levers together for resisting movement of one of the gripping levers with respect to the other of the gripping levers, the release mechanism being removable such that the biasing member is capable of moving the inner gripping lever with respect to the outer gripping lever toward the second orientation for actuating the braking mechanism, the release mechanism being coupled to the tether such that movement of the rider away from the release mechanism a distance greater than the length of the tether removes the release mechanism for permitting movement of the inner gripping member toward the second orientation.

6. The system of claim 5 wherein the biasing member comprises a spring urging movement of the inner gripping lever with respect to the outer gripping leyer.

7. The system of claim 5 wherein the release mechanism includes a release pin coupled to the tether and extending through apertures in the gripping levers for locking the gripping levers for rotating together.

8. The system of claim 5 in combination with a vehicle comprising a snowmobile.

9. An emergency braking system for use on a vehicle having a hand grip and a braking mechanism adapted for resisting movement of a drive mechanism of the vehicle when the braking mechanism is actuated, the system comprising:
   an inner gripping lever and at least one outer gripping lever adapted for being pivotally mounted to the hand grip of the vehicle, the inner gripping lever being positioned adjacent to the outer gripping lever, the inner and outer gripping levers each having a gripping portion and each being independently pivotable between a first orientation and a second orientation, the first orientation being characterized by the gripping portion of each of the gripping levers being spaced from the grip for deactuating the braking mechanism and the second orientation being characterized by the gripping portion of each of the gripping levers being positioned towards the grip for actuating the braking mechanism;
   a biasing member for biasing the inner gripping lever toward the second orientation;
   a tether for attachment to a rider of the vehicle, the tether having a length;
   a release mechanism locking the gripping levers together for resisting movement of one of the gripping levers with respect to the other of the gripping levers, the release mechanism being removable such that the biasing member is capable of moving the inner gripping lever with respect to the outer gripping lever toward the second orientation for actuating the braking mechanism, the release mechanism being coupled to the tether such that movement of the rider away from the release mechanism a distance greater than the length of the tether removes the release mechanism for permitting movement of the inner gripping member toward the second orientation;
   wherein the at least one outer gripping lever comprises a first outer gripping lever and a second outer gripping lever, the inner gripping lever being positioned between the first and second outer gripping levers.

10. The system of claim 9 wherein the biasing member comprises a spring urging movement of the inner gripping lever with respect to the outer gripping levers.

11. The system of claim 9 wherein the release mechanism includes a release pin coupled to the tether and extending through apertures in the gripping levers for locking the gripping levers for rotating together.

* * * * *